United States Patent [19]

Göbel et al.

[11] Patent Number: 5,278,206
[45] Date of Patent: Jan. 11, 1994

[54] BINDER FOR LIQUIDS

[75] Inventors: Gerd Göbel, Frankfurt; Ferdinand Angerer, Schaafheim; Ulrich Riegel, Frankfurt, all of Fed. Rep. of Germany

[73] Assignee: Cassella Aktiengesellschaft, Frankfurt, Fed. Rep. of Germany

[21] Appl. No.: 983,601

[22] Filed: Nov. 30, 1992

Related U.S. Application Data

[63] Continuation of Ser. No. 741,500, filed as PCT/EP90/00175, Feb. 1, 1990, abandoned.

[30] Foreign Application Priority Data

Feb. 16, 1989 [DE] Fed. Rep. of Germany ....... 3904642

[51] Int. Cl.$^5$ ............................................. C08L 89/00
[52] U.S. Cl. ........................................... 524/13; 524/9; 524/16; 524/34; 524/377; 524/378; 524/448; 106/900
[58] Field of Search ..................... 524/9, 13, 377, 378, 524/34, 16, 448; 106/900

[56] References Cited

U.S. PATENT DOCUMENTS

| | | | |
|---|---|---|---|
| 4,058,124 | 11/1977 | Yen et al. | 524/13 |
| 4,410,571 | 10/1983 | Korpman | 524/388 |
| 4,474,919 | 10/1984 | Polatajko-Lobos et al. | 524/377 |

FOREIGN PATENT DOCUMENTS

| | | |
|---|---|---|
| 0157960 | 10/1985 | European Pat. Off. |
| 0131312 | 2/1988 | European Pat. Off. |

*Primary Examiner*—Paul R. Michl
*Assistant Examiner*—LaVonda DeWitt
*Attorney, Agent, or Firm*—Connolly and Hutz

[57] ABSTRACT

Scatterable binder in pulverized form, for binding spilled liquids, comprising
a) superabsorbers,
b) Kieselguhr, peat, sawdust, wood meal, wood wool, straw, paper fibers, pulp or plastics in fibrous or milled form and
c) polyglycol, the content of polyglycol being up to 30% by weight and wherein said scatterable binder is in pulverized form and is a means for binding spilled liquids.

16 Claims, No Drawings

BINDER FOR LIQUIDS

This is a continuation of Ser. No. 07/741,500, filed as PCT/EP90/00175, Feb. 1, 1990, now abandoned.

A frequently occurring problem involves the binding of spilled, environmentally hazardous liquid substances in such a way that deeper penetration into the soil or flowing into the sewage system or rivers, which means polluting and endangering groundwater and surface water, can be avoided.

Known conventional binders for local limitation of contamination are sand, peat, sawdust or the like.

Mixtures of alkali metal or alkaline earth metal carbonates with kieselguhr and iron oxide are known as so-called chemical binders, in particular by fire brigades. Other known binders for oils are plastics foams of, for example, polyurethane, in particular milled PV foams, condensates based on phenol/formaldehyde/sulfuric acid and, for example, fibers and mats of polyethylene.

So-called superabsorbers are also known for binding aqueous liquids.

All systems currently used have disadvantages, some of which are serious. Thus, for example, binders which contain carbonates are completely unsuitable for use in acidic solutions since they can even react explosively by elimination of $CO_2$. In the case of improper handling or the use of the incorrect binder, damage may even be extended and made worse. All good binders for aqueous solutions have insufficient binding power for nonaqueous solutions, while virtually all good binders for nonaqueous solutions have insufficient or no absorptive capacity for aqueous systems.

Another disadvantage of some known binders is their low density, which causes them to float on the liquid to be absorbed or adsorbed, so that they have first to be stirred in mechanically in order to display their full activity. Furthermore, such products tend to produce large amounts of dust, with the result that, on the one hand, the personnel deployed are exposed to greater dangers and, on the other hand, material which is already slightly contaminated are (sic) blown by the action of the wind and contamination over a wide area can therefore occur.

The most serious disadvantage of all binders according to the prior art for liquid media is therefore their insufficient suitability for universal use.

It is therefore the object of the present invention to provide a binder for liquids which does not have the stated disadvantages, in particular can be universally used and rules out incorrect handling.

This object is achieved, surprisingly, by a binder which contains crosslinked, hydrogel-forming polymers and compounds with a large surface area and/or a capillary and/or fibrous structure.

Crosslinked, hydrogel-forming polymers are preferably the polymers known under the name "superabsorbers".

Preferred superabsorbers are those which are formed by polymerization of olefinic monomers, such as, for example, acrylic acid, acrylamide, methacrylic acid, methacrylamide, vinylsulfonic acid, maleic acid, fumaric acid, crotonic acid, 2-acrylamido-2-methylpropanesulfonic acid, 2-acrylamido-2-methylpropanephosphonic acid and vinylphosphonic acid and/or their half-esters and/or salts of the stated acids, in the presence of up to 2% by weight of polyfunctional epoxides, or monomers having at least two olefinically unsaturated double bonds, such as, for example, bisacrylamidoacetic acid, trimethylolpropane triacrylate and/or tetraalkyloxyethane (sic).

Particularly preferred superabsorbers are those which are prepared by polymerization of acrylamide and/or acrylic acid and/or a salt thereof, in the presence of up to 2% by weight of bisacrylamidoacetic acid, trimethylolpropane triacrylate and/or tetraallyloxyethane.

Compounds with a large surface area and/or a capillary and/or fibrous structure may be inorganic or organic, of natural origin or synthetically produced.

Preferred compounds of this type are, for example, kieselguhr, peat, sawdust, wood meal, wood wool, straw, paper fibers, pulp or plastics in fibrous or milled form, such as, for example, polyethylene fiber filler, polyethylene fluff or milled polyurethane foam, and the stated substances can also be used as a mixture with one another.

The binders according to the invention usually contain the superabsorber and the compound with a large surface area each in amounts of 10–90% by weight, preferably 30–70% by weight.

The binder according to the invention may optionally contain further additives. The addition of up to 30% by weight, particularly preferably up to 20% by weight, of a polyglycol is particularly preferred, with the result that possible dust formation by the binder can be avoided, which is advantageous particularly during use in the open air in a strong wind.

Preferred polyglycols are those which have a melting point of less than 20° C., in other words essentially polyglycols having a molecular weight of up to 500.

If the binder is to be used for scattering on traffic areas, up to 30% by weight, particularly preferably up to 20% by weight, of coarse-particled, sharp-edged materials, such as sand, chips or, preferably, crushed expanded clay, are preferably admixed as abrasive material to increase the resistance to skidding.

The binders according to the invention can be prepared by mixing the individual components in the desired ratio.

If the stated method only results in insufficient homogeneity of the product, or the compound with a large surface area has a very low bulk density, this too can be mixed in an appropriate amount with the mechnically comminuted, water-containing superabsorber crude product which was obtained by gel polymerization, even before said product is dried, and the mixture is kneaded, dried and milled and optionally further components are admixed.

Finally, the binder according to the invention can also be prepared by mixing the compound with a large surface area with the monomer solution of the superabsorber, carrying out polymerization by the process of gel polymerization and drying and milling the product obtained, and optionally admixing further components.

The binders according to the invention can be used in various forms for binding liquid media, for example in pure form by dumping to form a wall, by scattering in or on, which can be effected manually or with the aid of a gritter, by blowing or for sealing barrier layers. However, they can also be used in incorporated form, such as, for example, in nonwovens, woven fabrics or perforated films which are bag-, strand- or sausage-shaped, or in large, perforated, quilt-like mats, or pressed into pellets.

It is also particularly advantageous to blow the binders according to the invention onto the liquid to be bound, with the aid of a pressure container, such as, for example, can conveniently be carried during transport of hazardous materials.

The use forms described can also be used without loss of effectiveness where there is wind activity and independently of temperature influences.

The binders according to the invention are universally suitable for binding both aqueous, acidic or alkaline liquids and nonaqueous liquids or mixtures thereof with one another and display their binding activity even when they are simply scattered without mechanical aid. It may also be regarded as particularly advantageous that spent binder can be very easily removed from the surface onto which it has been scattered, without leaving residues. This can be effected manually or with the aid of industrial vacuum cleaners or suction pumps.

In contrast to conventional binders, aqueous liquids cannot be pressed out of the binders according to the invention by mechanical effects.

After removal of spent binders according to the invention from contaminated soil, a further amount of chemicals can be removed from the soil by further scattering of fresh binder. It is thus possible, with the binders according to the invention, to carry out long-term treatment even of large areas if the latter are additionally covered with water-impermeable films. In this way, it is also possible to remove radioactive substances from surfaces and soil.

The binders according to the invention can also be used for building up a vapor barrier. In other words, when scattered on toxic or strongly smelling media, less hazardous or odorous vapors escape than in the case of known binders, so that the personnel deployed can work closer to the endangered site and are in less danger. This also applies in particular to hydrochloric acid and other substances which fume strongly in the air.

The binders according to the invention are not fire-promoting. Superabsorbers have a flashpoint of over 2000° C., while the compounds with the large surface area are for the most part nonflammable.

The binders according to the invention constitute a considerable advance in the prevention or restriction of damage caused by spilled liquids.

The Examples which follow illustrate the present invention:

EXAMPLE 1

60 g of kieselguhr and 40 g of ®Tylose VS 3746 (superabsorber based on polyacrylate; ®Tylose is a registered trade mark of Hoechst AG, Frankfurt am Main) are mixed until complete homogeneity is obtained.

EXAMPLE 2

Example 1 is repeated using 55 g of kieselguhr, 36 g of ®Tylose VS 3746 and 9 g of polyethylene glycol 200.

EXAMPLE 3

635 g of water and 180 g of sodium bicarbonate are initially taken in a vessel well insulated with foamed plastic material and 240 g of acrylic acid are metered in at a rate such that the reaction solution does not foam over, said solution cooling down to a temperature of 10° to 8° C. 1.5 g of sodium diisooctylsulfosuccinate and a solution of 2 g of GENAPOL® OX 130 (GENAPOL® is a registered trade mark of Hoechst AG, Frankfurt) and 2.5 g of 1,1,1-trimethylolpropane triacrylate are then added. The initiators, a redox system consisting of 0.2 g of 2,2'-azobisamidinopropane dihydrochloride, dissolved in 2.5 g of water, 0.6 g of potassium peroxodisulfate, dissolved in 20 g of water, and 0.05 g of ascorbic acid, dissolved in 10 g of water, are added in succession at a temperature of 8°-10° C. and the mixture is stirred thoroughly. The reaction solution is allowed to stand without stirring, the temperature increasing to 80° C. and a solid gel being formed, as a result of polymerization which occurs.

1,000 g of the polymer gel thus obtained are mechanically comminuted, 245 g of polyethylene fluff are added and the mixture is kneaded in a kneader to give a homogeneous mixture and then dried at temperatures above 80° C. and milled.

EXAMPLE 4

Example 3 is repeated, 1,000 g of the polymer gel being replaced with 300 g of pulp fluff.

EXAMPLE 5

Repetition of Example 3 using 1,000 g of polymer gel and 200 g of milled polyurethane foam.

EXAMPLE 6

Repetition of Example 3 using 800 g of polymer gel, 360 g of polyethylene fluff and in addition 100 g of polyethylene glycol 300.

EXAMPLE 7

Repetition of Example 3 using 1,000 g of polymer gel and 280 g of polyethylene fiber filler having a fiber length of 1-6 cm.

Table 1 demonstrates the universal applicability of the binders according to the invention under conditions in practice, in comparison with known binders. The following symbols are used:

++ = very good
+ = good
° = possible
− = poor
−− = cannot be used

The following binders are compared:
A = Kieselguhr, commercially available
B = Pulp fluff, commercially available
C = ®Rench-Rapid, from Rench Rapid GmbH, Rechen; based on phenol/formaldehyde/sulfuric acid condensate
D = ®Metax 1713, from Chemital GmbH, Frankfurt/M.;
E = ®Ekoperl 99, from Eduard Michels GmbH, Essen; (®Metax and ®Ekoperl = mixtures based on carbonate/kieselguhr/iron oxide)
F = ®Tylose 3746, from Hoechst AG, Frankfurt/Main;
G = Mixture according to the invention (Example 2)

TABLE 1

|  | A | B | C | D | E | F | G |
|---|---|---|---|---|---|---|---|
| Can be manually scattered | − | − | + | ° | + | + | ++ |
| Scatterability, gritter | − | −− | ° | − | ° | + | ++ |
| Blowing by pressure container | −− | −− | −− | −− | −− | ++ | ++ |

TABLE 1-continued

|  | A | B | C | D | E | F | G |
|---|---|---|---|---|---|---|---|
| Behavior in wind (Dust formation and associated increase in area and endangering of personnel deployed) | − | − | − | − | + | ++ | ++ |
| Binding of harmful substances from surfaces and out of soil | o | − | o | o | o | + | ++ |
| Formation of a vapor barrier | − | − | o | − | − | + | ++ |
| Damming of liquids | − | − | − | − | o | + | ++ |
| Absorptivity for aqueous liquids | + | − | −− | + | + | ++ | ++ |
| Absorptivity for nonaqueous liquids | + | + | ++[a] | + | o | − | + |
| Absorptivity for dripping liquids with high specific gravity | o | − | − | o | o | + | ++ |
| Behavior to oxidizing agents | + | −−[b] | −−[b] | + | o | ++ | ++ |
| Behavior to acids or alkalis | ++ | − | +[c] | o[d] | o[d] | +[e] | ++[f] |
| Nonflammability | ++ | −[g] | −[h] | ++ | ++ | ++ | ++ |
| Removal of spent binder: |  |  |  |  |  |  |  |
| manually | − | + | + | − | − | + | ++ |
| with industrial vacuum cleaners | − | + | o | − | − | + | ++ |
| with suction pumps | o | − | o | o | − | o | ++ |

Explanations:
[a] Spontaneous ignition possible with oils
[b] Use not permitted; explosive reactions possible
[c] Decomposition with sulfuric acid at more than 60° C.
[d] Abrupt elimination of $CO_2$ possible
[e] Heating up to less than 70° C. with concentrated sulfuric acid
[f] Heating up to less than 50° C. with concentrated sulfuric acid
[g] Fire-promoting
[h] Fire-promoting, elimination of $SO_2$ and possibly phenol and formaldehyde

We claim:

1. Scatterable binder in pulverized form, for binding spilled liquids, comprising
   a) superabsorbers,
   b) kieselguhr, peat, sawdust, wood meal, wood wool, straw, paper fibers, pulp or plastics in fibrous or milled form and
   c) polyglycol, the content of polyglycol being up to 30% by weight and wherein said scatterable binder is in pulverized form and is a means for binding spilled liquids.

2. Scatterable binder according to claim 1, characterized in that the superabsorbers are prepared by polymerization of acrylamide and/or acrylic acid and/or a salt thereof in the presence of up to 2% by weight of bisacrylamidoacetic acid, trimethylolpropane triacrylate and/or tetraallyloxyethane.

3. Scatterable binder according to claim 1, characterized in that it contains the superabsorber and component (b) each in amounts of 10–90% by weight.

4. Scatterable binder according to claim 1, characterized in that the content of polyglycol is up to 20% by weight.

5. Scatterable binder according to claim 1, characterized in that it contains up to 30% by weight, of a coarse-particled, sharp-edged material.

6. Scatterable binder according to claim 1, wherein the component (b) is kieselguhr.

7. The scatterable binder as claimed in claim 1, wherein component b is polyethylene fiber filler or milled polyurethane foam or mixtures thereof.

8. The scatterable binder as claimed in claim 3, wherein components a and b are present each in amounts of 30 to 70% by weight.

9. The scatterable binder according to claim 1, wherein it contains up to 20% by weight of a coarse-particled, sharp-edged material.

10. A scatterable binder according to claim 9, wherein said coarse-particled, sharp-edged material is sand, chips or crushed expanded clay.

11. Process for the preparation of a scatterable binder of claim 1, characterized in that
   a) the individual components are mixed in a desired ratio or
   b) the compound with the large surface area is mixed in an appropriate amount with the mechanically comminuted, water-containing superabsorber crude product, which was obtained by gel polymerization, prior to drying of said product, the mixture is kneaded, dried and milled and optionally further components are admixed.

12. Process for binding spilled aqueous or nonaqueous liquids or mixtures of aqueous or nonaqueous liquids, characterized in that a scatterable binder according to claim 1 is brought into contact with the liquid to be bound.

13. Process for binding spilled aqueous or non-aqueous environmentally hazardous liquids comprising bringing a scatterable binder as claimed in claim 1, into contact with the liquid to be bound.

14. Process for binding spilled aqueous or non-aqueous environmentally hazardous liquids comprising bringing a scatterable binder as claimed in claim 2, into contact with the liquid to be bound.

15. Process for binding spilled aqueous or non-aqueous environmentally hazardous liquids comprising bringing a scatterable binder as claimed in claim 5, into contact with the liquid to be bound.

16. Process for binding spilled aqueous or non-aqueous environmentally hazardous liquids comprising bringing a scatterable binder as claimed in claim 10, into contact with the liquid to be bound.

* * * * *